Patented Nov. 13, 1951

2,574,547

UNITED STATES PATENT OFFICE 2,574,547

OXYALKYLATED POLYMERIZATION PRODUCTS OF CERTAIN RESINS CONTAINING BOTH HYDROXYL AND ALLYL RADICALS, AND METHOD OF MAKING SAME

Melvin De Groote, University City, Mo., assignor to Petrolite Corporation, Ltd., Wilmington, Del., a corporation of Delaware No Drawing. Application August 3, 1950, Serial No. 177,553

22 Claims. (Cl. 260—52)

1

The present invention is concerned with products derived by the oxyalkylation of certain polymerization products, which, in turn, are derived from resins containing both allyl radicals and hydroxyl radicals. Polymerization is the result of conventional polymerization reactions involving the allyl radicals. Oxyalkylation is conducted in a conventional manner with alpha-beta alkylene oxide, such as ethylene oxide, propylene oxide, etc. The products so obtained have peculiar properties, and, among other things, are surface-active agents.

Another aspect of the invention is concerned with the method of manufacturing the herein described oxyalkylation products. Such oxyalkylated products having terminal hydroxyl radicals may be used as intermediates for further reaction, such as esterification with higher fatty acids, with polycarboxy acids, with ethyleneimine, with epichlorohydrin, etc. The ultimate products so obtained have value for various industrial purposes, and again in many instances, represent valuable surface-active agents. Hydroxyl radicals and the manufacture of resins containing both allyl radicals, are described in my co-pending application Serial No. 177,551, filed August 3, 1950.

The polymerization of such resins, as, for example, by drastic oxidation, is described in my co-pending application, Serial No. 177,552, filed August 3, 1950.

Over and above this, such oxyalkylated derivatives are suitable for breaking oil field emulsions or other emulsions of the water-in-oil type, as described in my co-pending application Serial No. 177,554, filed August 3, 1950.

The oxyalkylated polymerized allyl radical-containing hydroxylated resins herein described are prepared especially by a six-step procedure:

(1) The preparation of phenol-aldehyde resins of the kind described in detail in U. S. Patent No. 2,499,370, dated March 7, 1950, to De Groote and Keiser, with the following qualification: Said aforementioned patent is limited to resins obtained from difunctional phenols having 4 to 12 carbon atoms in the substituent hydrocarbon radical. For the present purpose, the substituent may have as many as 18 carbon atoms, as in the case of resins prepared from tetradecylphenol, substantially para-tetradecylphenol, as sold by the Oronite Chemical Company, San Francisco, California. Similarly, resins can be prepared from hexadecylphenol or octadecylphenol. This feature will be referred to subsequently.

(2) The second step involves treating the phenol-aldehyde resin so obtained with an alkylene oxide selected from the class of ethylene oxide, propylene oxide, butylene oxide, glycide and methylglycide in the radio of at least one

2 and less than two moles of alkylene oxide per phenolic hydroxyl. The preparation of such derivatives is described in De Groote and Wirtel co-pending application Serial No. 99,361, filed June 15, 1949. Said co-pending application illustrates the use of resins in which the hydrocarbon substituent in the rings may have as many as 18 carbon atoms, as previously referred to.

(3) The third step involves the hydrogenation of such oxyalkylated resins, i. e., the conversion of the aromatic compounds into the alicyclic analogues. The procedure employed is described in detail in co-pending application of De Groote and Keiser, Serial No. 64,443, filed December 8, 1948. In said last mentioned co-pending application the phenols employed are selected from the same class referred to in U. S. Patent No. 2,499,370, but needless to say, the process is equally applicable in the class of phenols having as many as 18 carbon atoms in the substituent group, as previously described.

(4) The fourth step involves the treatment of the compounds in the presence of an alkaline catalyst, with allyl glycidyl ether.

(5) The fifth step involves polymerization by means of a suitable reactant, such as an organic peroxide, or by oxidation of a gaseous oxygen-containing medium, such as aid, or a combination of such procedures, or any other conventional procedure employed for producing polymers from conventional allyl radical-containing materials.

(6) The sixth and final step involves oxyalkylation by means of an alpha-beta alkylene oxide selected from the class of ethylene oxide, propylene oxide, butylene oxide, glycide and methyl glycide.

Briefly stated, the present process is concerned with the process and the products obtained by the following procedure, to wit, the process of (a) Reacting a phenol with an aldehyde so as to yield (b) An oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

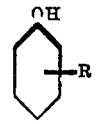

in which R is a hydrocarbon radical having at least 4 and not more than 18 carbon atoms and substituted in the 2,4,6 position; subjecting said aforementioned resin to oxyalkylation with (c) An alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than 2 moles of alkylene oxide be introduced for each phenolic nucleus;

(d) Converting said oxyalkylated resin into the corresponding alicyclic compound by hydrogenation in presence of a hydrogenating catalyst;

(e) Reacting said hydroaromatic compound with allyl glycidyl ether, with the proviso that at least 2 moles of allyl glycidyl ether be reacted for each alicyclic molecule and not in excess of three times the number of hydroxyl radicals present in said molecule;

(f) Polymerizing said allyl radical-containing hydroaromatic compounds; and (g) Subjecting said polymers to oxyalkylation in the manner hereinafter described.

For purpose of convenience and also for ease of comparison with the aforementioned patent, or aforementioned co-pending applications, what is said hereinafter will be divided into six parts:

Part 1 will be concerned with the preparation of the resins;

Part 2 will be concerned with the oxyalkylation of the resins;

Part 3 will be concerned with the hydrogenation of the resins;

Part 4 will be concerned with the reaction of the alicyclic products with allyl glycidyl ether;

Part 5 will be concerned with the polymerization of the allyl radical-containing alicyclic compounds or products described in Part 4, immediately preceding; and Part 6 will be concerned with the oxyalkylation of the organic solvent-soluble polymers described in Part 5, preceding.

PART 1

Reference is made to the following U. S. patents: Nos. 2,499,365; 2,499,366; 2,499,367; 2,499,368, and 2,499,370, all dated March 7, 1950, to De Groote and Keiser. These patents describe phenolic resins of the kind herein employed as initial materials. For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance at least, at the present time.

For specific description of such resins, reference is made particularly to Patent 2,499,370 and to Examples 1a through 103a of that patent for specific examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol, or a mixture of the same. Such resins are described also in issued patents, for instance, U. S. Patent No. 2,499,365, dated March 7, 1950, to De Groote and Keiser, such as Example 71a.

PART 2

As has been pointed out previously, suitable resins can be made following the procedures previously described, or, for that matter, can be purchased in the open market. The second step in the overall process involves the use of an alkylene oxide, such as ethylene oxide, propylene oxide and glycide, or methylglycide. The most suitable oxides, from an economical standpoint, are ethylene oxide or propylene oxide. Obviously, the apparatus suitable for oxyethylation is also suitable for oxypropylation and will serve, if desired, for use with glycide.

I have prepared a large number of resins of the kind described in Part 1, preceding, on a laboratory scale varying from a few hundred grams or less to somewhat larger amounts. Needless to say, they are also prepared regularly on an industrial scale. This same statement applies to the preparation of the oxyalkylated products with which this second part is concerned.

For a number of well known reasons, equipment, whether laboratory size, semi-pilot plant size, pilot plant size, or large scale size, is not, as a rule, designed for a particular alkylene oxide. Invariably and inevitably, however, and particularly in the case of laboratory equipment, the design is such as to use any of the customarily available alkylene oxides, i. e., ethylene oxide, propylene oxide, butylene oxide, glycide, epichlorohydrin, styrene oxide, etc.

Oxyethylations and oxypropylations are conducted under a wide variety of conditions, not only in regard to presence or absence of catalyst, kind of catalyst previously described, but also in regard to the time of reaction, temperature of reaction, speed of reaction, pressure during reaction, etc. Oxyalkylations can be conducted at temperatures approximating the boiling point of water or slightly above, as, for example, 115° to 120° C.

Likewise, resins can be oxyalkylated, particularly with ethylene oxide or propylene oxide, using temperatures and pressures which are comparatively high, for instance, temperatures in the neighborhood of 200° C., or in excess thereof, and pressures in the neighborhood of 200 pounds per square inch, or in excess thereof. Such oxyalkylations have been described in aforementioned U. S. Patent No. 2,499,370. Generally speaking, such procedure is employed under conditions where there are more than three points of reaction per molecule, and where the amount of oxide added is comparatively high in ratio to the initial reactant. Such procedure is entirely satisfactory in particular oxyalkylation step described in the instant part, i. e., Part 2.

However, since the amount of oxide is comparatively small, less than two moles per phenolic hydroxyl present in the resin unit, it is apparent that time is not a factor. In other words, it is just as satisfactory to employ a comparatively low temperature and low temperature and low pressure, rather than conditions of oxyalkylation previously mentioned, which result in a rapid reaction rate. For this reason, I have employed conditions of the kind involving temperatures of about 95° to 115° C., and pressures of 30 to 40 pounds, or less. If an atmosphere of inert gas, such as nitrogen, is present during a reaction, needless to say, the pressures may be somewhat higher.

Such low temperature, low reaction rate oxyalkylations have been described very completely in U. S. Patent No. 2,448,664 to Fife et al., dated September 7, 1948.

As previously indicated, low pressure, low temperature reaction rates may require considerable time, as, for instance, in some of the subsequent examples in the neighborhood of one to two hours. Actually, at 180° to 200° C., such reaction might be conducted in ten minutes or less. In large scale, low temperature operations, the time might be somewhat longer, for instance, 5 to 8 hours. In any event, the reaction is so comparatively short that it is of no marked significance, but it is more convenient to use these lower temperatures on a laboratory or semi-pilot plant scale.

I have used conventional equipment with two added automatic features:

(a) A solenoid-controlled valve which shuts off the propylene oxide in event that the temperature gets outside a predetermined and set range, for instance, 110° to 120° C., and (b) Another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose, where the pressure of reaction is higher, speed of reaction is higher, and time of reaction is much shorter. For reasons which are obvious in light of what has been said previously, I have not found it necessary to use such automatic controls under the conditions of oxyethylation employed in introducing such small portion of alkylene oxide. Controls could be used, if desired, and certainly would be used in high temperature oxyalkylation.

Thus, in preparing the various examples, I have found it particularly advantageous to use laboratory equipment which is designed to permit continuous oxyalkylation, whether it be oxypropylation or oxyethylation. With certain changes, as will be pointed out hereinafter, the equipment can be used also to permit oxyalkylation involving the use of glycide, where no pressure is involved, except the vapor pressure of a solvent, if any, which may have been used as a diluent.

As previously pointed out, the method of using propylene oxide is the same as ethylene oxide. This point is emphasized only for the reason that the apparatus is so designed and constructed as to use either oxide.

The oxyethylation or oxypropylation procedure employed in the preparation of the oxyalkylated derivatives has been uniformly the same, particularly in light of the fact that either a continuous, automatically-controlled procedure was employed, or else a short non-automatic method is used. Indeed, in this instance, the latter is preferred. In this procedure the autoclave was a conventional autoclave made of stainless steel and having a capacity of approximately one gallon and a working pressure of 1,000 pounds gauge pressure. This pressure obviously is far beyond any requirement, as far as ethylene or propylene oxide goes, unless there is a reaction of explosive violence involved, due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge; manual vent line; charge hole for initial reactants; at least, one connection for introducing the alkylene oxide, such as propylene oxide or ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves are, of course, in essence small-scale replicas of the usual conventional autoclave used in oxyalkylation procedures. In some instances, a larger autoclave was used, i. e., one having a capacity ranging in the neighborhood of 1¾ gallons.

Continuous operation, or substantially continuous operation, was achieved by the use of a separate container to hold the alkylene oxide being employed, particularly ethylene oxide or propylene oxide. The container consists essentially of a laboratory bomb having a capacity of about one-half gallon, or somewhat in excess thereof. In some instances, a larger bomb was used, to wit, one having a capacity of about one gallon. This bomb was equipped, also, with an inlet for charging and an eductor tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

In using the small amounts of oxide involved in ratio to initial reactant, i. e., the phenol-aldehyde resin, one need not employ the automatic devices unless desired. Autoclaves of the kind described are equipped with automatic controls which would shut off the ethylene oxide or propylene oxide in event temperature of reaction passes out of the predetermined range, or pressure in the autoclave passes out of the predetermined range. However, in procedure of the kind herein reported, I have done nothing further than to set the inlet open so the oxide was added in approximately two hours and then proceed to let the autoclave run for a total of three hours to insure completeness of reaction. Pressures in no instance registered more than 30 to 40 pounds and the temperatures varied from 95° to 115° C.

One thing must be borne in mind when operating at these comparatively low temperatures of oxyalkylation. When operating at a comparatively high temperature, for instance, between 150° to 200° C., an unreacted alkylene oxide, such as ethylene or propylene oxide, makes its presence felt in the increase in pressure or the consistency of a high pressure. However, at a low enough temperature it may happen that the oxide, such as propylene oxide, goes in as a liquid. If so, and if it remains unreacted, there is, of course, an inherent danger and appropriate steps must be taken to safeguard against this possibility; if need be, a sample must be withdrawn and examined for unreacted propylene oxide, or ethylene oxide. One obvious procedure, of course, is to oxypropylate or oxyethylate at a modestly higher temperature, for instance, 140° to 150° C. Obviously, similar precautions are necessary in the case of ethylene oxide, although it is more reactive than propylene oxide.

I have found it comparatively simple to manually control the temperature of reaction by use of cooling water, steam, or electrical heat to raise or lower the temperature. It will be noted the entire procedure herein involved is much simpler than where low-pressure, low-temperature, low-speed reactants are employed in an effort to bring out the introduction of a comparatively large amount of alkylene oxide. Such procedure is sometimes used, for example, in treating diols or triols with ten to twenty or even thirty times their weight of alkylene oxide.

A word can be included in regard to the use of glycide. This is particularly pertinent, because Part 4 is concerned with a reaction involving allyl glycidyl ether, which reaction is also an oxyalkylation, broadly speaking, and involves a reactant which is comparable to glycide. This is obvious, since glycide is 1-hydroxy-2,3-epoxypropane, and allyl glycidyl ether is 1-allyloxy-2,3-exoxypropane. As previously pointed out, glycide is an alkylene oxide suitable for use in reaction with phenol-aldehyde resins. If either glycide or methylglycide is employed, no appreciable pressure is involved and no effort need be made to use equipment with automatic controls.

Indeed, in the use of a number of initial reactants with glycide, the entire equipment was used almost as if it were an ordinary piece of nonpressure laboratory equipment, since such reactions can be so conducted. Due to the high boiling point of glycide, one can readily employ a separable glass resin pot, as described in U. S. Patent No. 2,499,365, dated March 7, 1950, to De Groote et al., and offered for sale by numerous laboratory supply houses. Equipment of this kind has been advertised extensively in current chemical journals.

If such arrangement is used to prepare laboratory-scale duplications, then care should be taken that the heating mantle can be removed rapidly, so as to allow for cooling; or better still, through an added opening at the top of the glass resin pot or comparable vessel should be passed a stainless steel cooling coil so that the pot can be cooled more rapidly than by mere removal of mantle. If a stainless steel coil is introduced, it means that the conventional stirrer of the paddle type is changed to one of the centrifugal type, which causes the fluid or reactants to mix, due to swirling action in the center of the pot. Still better is the use of a metal laboratory autoclave of the kind previously described above, but in any event, when the initial amount of glycide is added to a resin, for example, in order to convert it into an oxyalkylated derivative, speed of reaction should be controlled by the usual factors such as (a) the addition of glycide; (b) the elimination of external heat; and (c) the use of cooling so there is no undue rise in temperature. All the foregoing is merely conventional, but is included, due to the hazard in handling glycide. As to the use of glycide as an oxyalkylating agent, see U. S. Patent No. 2,089,569, dated August 10, 1937, to Orthner et al.

The amount of catalyst used in oxyalkylation may vary from as little as ½% up to 5%. The amount may vary during the oxypropylation period, as exemplified by the addition of the catalyst at the very beginning of the reaction only and with no further addition. Needless to say, there is a comparatively high concentration of catalyst at the beginning of the reaction and a comparatively low concentration at the end; in fact, not infrequently the amount of catalyst at the end will be one-half of 1% sodium methylate, or caustic soda, or less. Catalyst can be added intermittently during the reaction period, provided suitable equipment is available. It is rather difficult to employ such equipment on a laboratory scale, but it can be employed, of course, on a pilot plant scale or larger scale.

In the present situation, since comparatively little of the alkylene oxide was added per phenolic hydroxyl, time of reaction is not apt to be a factor. The amount of alkylene oxide may vary, for example, from one-half mole to less than two moles per phenolic hydroxyl. In other comparable oxyalkylations, as have been described in the literature, the amount of oxide added might be 50 to 100 times this amount. Under such circumstances, it is necessary to speed up the reaction in order to finish the process within a reasonable length of time. In the present case the amount of oxide added was so small that even using a low-temperature (95° to 115° C.) and a comparatively low pressure, less than 30 or 40 pounds maximum, the reaction was complete in a very short period of time. As a convenience, I have generally added the oxide over a 3-hour period, since the apparatus was practically automatic. The amount of catalyst used was generally about 1.0% of the initial resin. Somewhat more can be used, or slightly less. If more is used the reaction would, of course, be faster, and if less is used, reaction might be a little slower. It is my preference to use a minimum amount of catalyst, rather than an excessive amount, for the reason that it is desirable to neutralize the excess alkalinity with hydrochloric acid, for example, or sulfuric acid, or phosphoric acid, and remove the inorganic salt prior to hydrogenation, as described in Part 3, succeeding.

One limitation of small-scale autoclave equipment (a gallon to a 2-gallon autoclave) is the difficulty involved in a suitable automatic device for adding a dry catalyst such as sodium methylate, during the reaction. This presents no problem on a large scale with larger size equipment, and thus, the same operation conducted in equipment of increased capacity means that all the catalyst need not be added at once, but can be added intermittently in a predetermined amount, based on an hourly rate, or based on the addition of ethylene or propylene oxide. For instance, in a large scale operation involving equipment having about twenty-five times the capacity of the autoclave employed, arrangements were made to introduce better than a gallon of ethylene or propylene oxide (4,000 grams) per hour, along with the introduction of 20 grams of sodium methylate hourly during the operation period.

The net result, as far as the final material was concerned, was the same, to wit, a residual alkaline catalyst equivalent to about ½% sodium methylate.

In the following example sodium methylate is used as a catalyst. The resin used was prepared in the manner described by reference to the a examples in Part 1. In practically every instance, the resin was re-prepared in a triple amount, i. e., using 3 moles of the phenol as a starting material. In each instance the amount of xylene employed was three times the amount used when only one mole of a phenol was employed, i. e., 300 grams. In all other respects, amount of aldehyde, etc., the procedure was the same, the weight ratios only being different. In the succeeding tables the amount of xylene resin solution is shown by weight; subtracting 300 in each instance gives the weight of the resin. For purpose of calculation the alkylene oxide added and the original phenol employed in manufacture was used as a basis. This was more convenient than using the weight of resin obtained, because it may vary somewhat from batch to batch. The weight of the resin solution was such as to correspond with the original weight shown in Part 1. This is obvious by mere comparison. Actually, the amount was weighed on a laboratory balance which may have been inaccurate to the extent of 1/4% or 1/2%. This, of course, is immaterial in a procedure of the present type. Similarly, the ethylene oxide and propylene oxide were weighed as closely as possible, but here again, the variation could have been off 1/2% to 1%. 3-gram moles of the phenol were used to provide the resin. The amount of oxides employed are shown in the table. The amount of catalyst (sodium methylate) employed is also shown. In all instances, the temperature as stated, was never higher than 115° C. and generally varied from 100° to 110° C. The pressure was never higher than 40 pounds per square inch, and in all instances, the reaction was complete in three hours.

Oxyethylation or oxypropylation was conducted in the usual manner, first sweeping out the equipment with nitrogen and setting the controls as far as the addition of the oxide was concerned, but ignoring the controls as far as temperature and pressure were concerned. Any adjustment required in the matter of temperature and pressure could be made manually by examination of the gauges a few times during the entire procedure. The next step was to add the ethylene oxide or propylene oxide in such a manner that it was injected in the reaction vessel in somewhere between 2 to 2½ hours, and then permitting the reaction period to extend up to 3 hours, so as to be sure all the oxide had combined. A specific example is included, following by way of illustration:

*Example 1b*

486 grams of a resin of the kind described in Example 1a of Patent 2,499,370 mixed with 300 grams of xylene, were used as the initial charge. To this there was added about 1% (5 grams) of sodium methylate. These ingredients were placed in the autoclave and the autoclave sealed and the automatic devices adjusted for injecting a comparatively small amount of oxide, 135 grams, in about 2¼ hours. The reaction was continued for a total of 3 hours, however, to be sure it was complete. This is a ratio of one mole of oxide for each initial phenolic hydroxyl involved in resin manufacture. The temperature was approximately 110° C. and the pressure was less than 30 pounds per square inch. The final product was a viscous, semi-resinous product, being somewhat between a resin and a viscous, amber-colored fluid obtained by increased oxyethylation. In such instances where the resins employed were liquids, needless to say, further oxyalkylation was in the direction of reduced viscosity. Some resins which were practically viscous liquids to start with became less viscous or more towards the liquid stage. The color varied from deep red or amber to some darker shades, and in some instances, lighter shades. The residual product was, of course, slightly alkaline.

For the purpose described in the next successive part each particular sample was neutralized with hydrochloric acid and then, the xylene eliminated by vacuum distillation. The resin or tacky resinous liquid, or liquids, so obtained was then dissolved in ethyl alcohol and filtered to remove any inorganic salts. The xylene-free alcohol solution was used for hydrogenation as outlined in Part 3, immediately following.

The following table illustrates a variety of suitably oxyalkylated resins. Such resins can be treated, of course, with glycide in exactly the same manner under the same conditions, with the exception that the autoclave is simply used as a reaction vessel with a condenser and without the use of pressure. However, in handling glycide I prefer to use the glass resin pot in the manner previously described. Glycide reacts very rapidly and the molecular proportions, etc., are within the limits previously specified. The resins are identified in terms of the example numbers of Patent 2,499,370.

| Ex. No. | Ex. No. of Resin | Grs. of Resin Xylene Solution | No. of Gr. Mols. Orig. Phenol Represented by Solution | Grs. ETO Used | Mol. Equivalent | Ratio Mol. Oxide to Phenolic Hydroxyl | Catalyst Employed | Amt. of Catalyst | Max. Temp., °C. | Max. Pres., per sq. in. | Time, in hours |
|---|---|---|---|---|---|---|---|---|---|---|---|
| 1b | 1a | 786 | 3 | 135 | 3 | 1:1 | Sodium methylate | 5 | 95-115 | Up to 40 lbs. | 3 hrs. or less. |
| 2b | 1a | 786 | 3 | 200 | 4½ | 1½:1 | ...do... | 5 | 95-115 | ...do... | Do. |
| 3b | 1a | 786 | 3 | 235 | 5¼ | 1¾:1 | ...do... | 5 | 95-115 | ...do... | Do. |
| 4b | 3a | 828 | 3 | 135 | 3 | 1:1 | ...do... | 6 | 95-115 | ...do... | Do. |
| 5b | 3a | 828 | 3 | 200 | 4½ | 1½:1 | ...do... | 6 | 95-115 | ...do... | Do. |
| 6b | 3a | 828 | 3 | 235 | 5¼ | 1¾:1 | ...do... | 6 | 95-115 | ...do... | Do. |
| 7b | 7a | 870 | 3 | 135 | 3 | 1:1 | ...do... | 6 | 95-115 | ...do... | Do. |
| 8b | 7a | 870 | 3 | 200 | 4½ | 1½:1 | ...do... | 6 | 95-115 | ...do... | Do. |
| 9b | 7a | 870 | 3 | 235 | 5¼ | 1¾:1 | ...do... | 6 | 95-115 | ...do... | Do. |
| 10b | 8a | 954 | 3 | 135 | 3 | 1:1 | ...do... | 7 | 95-115 | ...do... | Do. |
| 11b | 8a | 954 | 3 | 200 | 4½ | 1½:1 | ...do... | 7 | 95-115 | ...do... | Do. |
| 12b | 8a | 954 | 3 | 235 | 5¼ | 1¾:1 | ...do... | 7 | 95-115 | ...do... | Do. |
| 13b | 9a | 846 | 3 | 135 | 3 | 1:1 | ...do... | 6 | 95-115 | ...do... | Do. |
| 14b | 9a | 846 | 3 | 200 | 4½ | 1½:1 | ...do... | 6 | 95-115 | ...do... | Do. |
| 15b | 9a | 846 | 3 | 235 | 5¼ | 1¾:1 | ...do... | 6 | 95-115 | ...do... | Do. |
| 16b | 69a | 1,032 | 3 | 135 | 3 | 1:1 | ...do... | 7 | 95-115 | ...do... | Do. |
| 17b | 69a | 1,032 | 3 | 200 | 4½ | 1½:1 | ...do... | 7 | 95-115 | ...do... | Do. |
| 18b | 69a | 1,032 | 3 | 235 | 5¼ | 1¾:1 | ...do... | 7 | 95-115 | ...do... | Do. |
| 19b | 70a | 996 | 3 | 135 | 3 | 1:1 | ...do... | 6 | 95-115 | ...do... | Do. |
| 20b | 70a | 996 | 3 | 200 | 4½ | 1½:1 | ...do... | 6 | 95-115 | ...do... | Do. |
| 21b | 70a | 996 | 3 | 235 | 5¼ | 1¾:1 | ...do... | 6 | 95-115 | ...do... | Do. |
| 22b | 70a | 1,038 | 3 | 135 | 3 | 1:1 | ...do... | 7 | 95-115 | ...do... | Do. |
| 23b | 70a | 1,038 | 3 | 200 | 4½ | 1½:1 | ...do... | 7 | 95-115 | ...do... | Do. |
| 24b | 70a | 1,038 | 3 | 235 | 5¼ | 1¾:1 | ...do... | 7 | 95-115 | ...do... | Do. |
| 25b | 73a | 1,122 | 3 | 135 | 3 | 1:1 | ...do... | 8 | 95-115 | ...do... | Do. |
| 26b | 73a | 1,122 | 3 | 200 | 4½ | 1½:1 | ...do... | 8 | 95-115 | ...do... | Do. |
| 27b | 73a | 1,122 | 3 | 235 | 5¼ | 1¾:1 | ...do... | 8 | 95-115 | ...do... | Do. |
| 28b | 14a | 810 | 3 | 135 | 3 | 1:1 | ...do... | 5 | 95-115 | ...do... | Do. |
| 29b | 14a | 810 | 3 | 200 | 4½ | 1½:1 | ...do... | 5 | 95-115 | ...do... | Do. |
| 30b | 14a | 810 | 3 | 235 | 5¼ | 1¾ | ...do... | 5 | 95-115 | ...do... | Do. |

| Ex. No. | Ex. No. of Resin | Grs. of Resin Xylene Solution | No. of Gr. Mols. Orig. Phenol Represented by Solution | Grs. PRO Used | Mol. Equivalent | Ratio Mol. Oxide to Phenolic Hydroxyl | Catalyst Employed | Amt. of Catalyst | Max. Temp., °C. | Max. Pres., per sq. in. | Time, in hours |
|---|---|---|---|---|---|---|---|---|---|---|---|
| 31b | 1a | 786 | 3 | 175 | 3 | 1:1 | Sodium Methylate | 5 | 95-115 | Up to 40 lbs. | 3 hrs. or less. |
| 32b | 1a | 786 | 3 | 260 | 4½ | 1½:1 | ...do... | 5 | 95-115 | ...do... | Do. |
| 33b | 1a | 786 | 3 | 305 | 5¼ | 1¾:1 | ...do... | 5 | 95-115 | ...do... | Do. |
| 34b | 3a | 828 | 3 | 175 | 3 | 1:1 | ...do... | 6 | 95-115 | ...do... | Do. |
| 35b | 3a | 828 | 3 | 260 | 4½ | 1½:1 | ...do... | 6 | 95-115 | ...do... | Do. |
| 36b | 3a | 828 | 3 | 305 | 5¼ | 1¾:1 | ...do... | 6 | 95-115 | ...do... | Do. |
| 37b | 7a | 870 | 3 | 175 | 3 | 1:1 | ...do... | 6 | 95-115 | ...do... | Do. |
| 38b | 7a | 870 | 3 | 260 | 4½ | 1½:1 | ...do... | 6 | 95-115 | ...do... | Do. |
| 39b | 7a | 870 | 3 | 305 | 5¼ | 1¾:1 | ...do... | 6 | 95-115 | ...do... | Do. |
| 40b | 8a | 954 | 3 | 175 | 3 | 1:1 | ...do... | 7 | 95-115 | ...do... | Do. |
| 41b | 8a | 954 | 3 | 260 | 4½ | 1½:1 | ...do... | 7 | 95-115 | ...do... | Do. |
| 42b | 8a | 954 | 3 | 305 | 5¼ | 1¾:1 | ...do... | 7 | 95-115 | ...do... | Do. |
| 43b | 72a | 1,038 | 3 | 175 | 3 | 1:1 | ...do... | 7 | 95-115 | ...do... | Do. |
| 44b | 72a | 1,038 | 3 | 260 | 4½ | 1½:1 | ...do... | 7 | 95-115 | ...do... | Do. |
| 45b | 72a | 1,038 | 3 | 305 | 5¼ | 1¾:1 | ...do... | 7 | 95-115 | ...do... | Do. |
| 46b | 73a | 1,122 | 3 | 175 | 3 | 1:1 | ...do... | 8 | 95-115 | ...do... | Do. |
| 47b | 73a | 1,122 | 3 | 260 | 4½ | 1½:1 | ...do... | 8 | 95-115 | ...do... | Do. |
| 48b | 73a | 1,122 | 3 | 305 | 5¼ | 1¾:1 | ...do... | 8 | 95-115 | ...do... | Do. |
| 49b | 14a | 810 | 3 | 175 | 3 | 1:1 | ...do... | 5 | 95-115 | ...do... | Do. |
| 50b | 14a | 810 | 3 | 260 | 4½ | 1½:1 | ...do... | 5 | 95-115 | ...do... | Do. |
| 51b | 14a | 810 | 3 | 305 | 5¼ | 1¾:1 | ...do... | 5 | 95-115 | ...do... | Do. |
| 52b | 24a | 1,062 | 3 | 175 | 3 | 1:1 | ...do... | 7 | 95-115 | ...do... | Do. |
| 53b | 24a | 1,062 | 3 | 260 | 4½ | 1½:1 | ...do... | 7 | 95-115 | ...do... | Do. |
| 54b | 24a | 1,062 | 3 | 305 | 5¼ | 1¾:1 | ...do... | 7 | 95-115 | ...do... | Do. |
| 55b | 34a | 843 | 3 | 175 | 3 | 1:1 | ...do... | 5 | 95-115 | ...do... | Do. |
| 56b | 34a | 843 | 3 | 260 | 4½ | 1½:1 | ...do... | 5 | 95-115 | ...do... | Do. |
| 57b | 34a | 843 | 3 | 305 | 5¼ | 1¾:1 | ...do... | 5 | 95-115 | ...do... | Do. |
| 58b | 80a | 1,365 | 3 | 175 | 3 | 1:1 | ...do... | 10 | 95-115 | ...do... | Do. |
| 59b | 80a | 1,365 | 3 | 260 | 4½ | 1½:1 | ...do... | 10 | 95-115 | ...do... | Do. |
| 60b | 80a | 1,365 | 3 | 305 | 5¼ | 1¾:1 | ...do... | 10 | 95-115 | ...do... | Do. |

PART 3

Example 1c

The oxyalkylated resin was the one previously identified as Example 1b. This product, as prepared, contained xylene and a small amount of basic catalyst. Enough concentrated hydrochloric acid was added to neutralize the basic catalyst. As previously noted, the xylene was removed by vacuum distillation at a temperature not in excess of 200° C. During the removal of the xylene, the water introduced by the addition of a small amount of hydrochloric acid was also eliminated together with any small excess of hydrochloric acid, which may have been present. This residual material was then dissolved in 300 grams of ethyl alcohol, i. e., an amount equal to the xylene originally present. The anhydrous ethyl alcohol solution was allowed to stand for three days and then filtered so as to remove a small amount of precipitate. The amount of solution at this time was substantially the same as at the end of the previous operation, to wit, approximately 921 grams, of which 300 grams represented solvent. This was hydrogenated in two substantially equal half portions. Approximately 460 grams of the material described were placed in an autoclave along with 31 grams of Raney nickel. The amount of Raney nickel used in all instances was approximately 10%, by weight, of oxyalkylated reaction calculated on a solvent-free basis.

The apparatus employed was a stirring type super-pressure autoclave manufactured by the American Instrument Co., Silver Spring, Maryland, and described in their Catalogue No. 406 as the 4⅜" series. The instrument was, of course, equipped with all the conventional fittings. The stirring speed employed was approximately 450 R. P. M. The following table shows the time required to hydrogenate. The initial time period shows the starting period in the morning and the second and third columns show the gauge pressure in pounds per square inch and the temperature in degrees centigrade:

| Time | Pressure | Temperature, °C. | Time | Pressure | Temperature, °C. |
|---|---|---|---|---|---|
| 8:00 | 1,270 | 15 | 10:19 | 1,780 | 170 |
| 8:19 | 1,350 | 30 | 10:30 | 1,820 | 180 |
| 8:22 | 1,380 | 40 | 10:37 | 1,820 | 180 |
| 8:28 | 1,450 | 55 | 11:01 | 1,750 | 165 |
| 8:31 | 1,500 | 70 | 11:27 | 1,740 | 165 |
| 8:35 | 1,550 | 80 | 11:43 | 1,750 | 170 |
| 8:39 | 1,580 | 95 | 11:58 | 1,800 | 175 |
| 8:42 | 1,630 | 100 | 12:07 | 1,830 | 180 |
| 8:47 | 1,660 | 110 | 12:15 | 1,860 | 190 |
| 8:53 | 1,700 | 120 | 12:22 | 1,860 | 205 |
| 8:57 | 1,720 | 130 | 12:30 | 1,850 | 205 |
| 9:01 | 1,750 | 135 | 12:39 | 1,830 | 195 |
| 9:05 | 1,760 | 135 | 12:46 | 1,850 | 210 |
| 9:10 | 1,760 | 140 | 12:55 | 1,870 | 200 |
| 9:16 | 1,770 | 140 | 1:02 | 1,850 | 220 |
| 9:32 | 1,780 | 145 | 1:12 | 1,800 | 230 |
| 9:44 | 1,800 | 150 | 1:20 | 1,750 | 225 |
| 9:48 | 1,820 | 155 | 1:42 | 1,730 | 225 |
| 9:56 | 1,830 | 160 | 2:00 | 1,710 | 220 |
| 10:07 | 1,810 | 160 | 2:16 | 1,700 | 230 |
| 10:14 | 1,800 | 165 | 2:20 | 1,690 | 240 |

The next morning, after standing overnight, the temperature had dropped to 26° C. and the pressure to about 835 pounds. The material was then removed by draining the autoclave and then washing with approximately 400 to 500 grams of anhydrous isopropyl alcohol. The mixture of alcohols was then removed by vacuum distillation at less than 100° C. The hydrogenated product was substantially identical in color as prior to hydrogenation, although there may have been some bleaching effect during the hydrogenation reaction. The solubility of the material was not particularly changed in comparison to the product prior to hydrogenation. The tests for aromatic character, such as decolorization of bromine water, indicated that the product was entirely, or nearly entirely, converted into a hydroaromatic compound.

Similar hydrogenation was conducted in which no alcohol was employed as a solvent, the resin having been added to the autoclave in a powdered form, and in such procedure the temperature of the autoclave was raised to 120° C. before starting to introduce hydrogen. The hydrogen was introduced cautiously, being careful to see that the pressure did not go past 1900 pounds and that the temperature did not get past 235° C. The presence or absence of alcohol did not seem to matter particularly, as it was merely a choice with regard to convenience. Other alcohols can be used, such as methyl, propyl, etc. Such alcohols, of course, do cause some increase in pressure, particularly at the higher operating temperatures.

The same procedure was carried out in regard to all the various oxyalkylated products described in Part 2, preceding. The following table shows the example number correspondence between the oxyethylated non-hydrogenated material and the derivative obtained by hydrogenation, together with the maximum temperature, pressure, and time employed to hydrogenation. In each instance the amount of catalyst employed (Raney nickel) was approximately 10% of the solvent-free powder. In some instances, low molal alcohols were employed as solvents, and in other instances, no solvent was present. Actually, the hydrogenation procedure, using Raney nickel and equipment of the kind now available is comparatively simple.

In the matter of hydrogenated phenol-aldehyde resins, see U. S. Patents Nos. 2,072,142 and 2,072,143, both dated March 2, 1937, and both to Ubben.

| Ex. No. of Hydrogenated Derivative | Ex. No. of Oxyalkylated Resin | Max. Temp., °C. | Max. Pres., lbs. per square inch | Time of Hydrogenation, hours |
|---|---|---|---|---|
| 1c | 1b | 240 | 1,870 | 6½ |
| 2c | 2b | 250 | 1,830 | 6 |
| 3c | 3b | 260 | 1,790 | 5¾ |
| 4c | 4b | 245 | 1,815 | 6¼ |
| 5c | 5b | 250 | 1,890 | 6¾ |
| 6c | 6b | 260 | 1,835 | 5½ |
| 7c | 7b | 240 | 1,795 | 5¼ |
| 8c | 8b | 235 | 1,800 | 6½ |
| 9c | 9b | 230 | 1,730 | 6¾ |
| 10c | 10b | 250 | 1,725 | 5¼ |
| 11c | 11b | 245 | 1,750 | 5½ |
| 12c | 12b | 240 | 1,725 | 7 |
| 13c | 13b | 240 | 1,800 | 6½ |
| 14c | 14b | 230 | 1,825 | 6½ |
| 15c | 15b | 235 | 1,830 | 7¾ |
| 16c | 16b | 245 | 1,850 | 7 |
| 17c | 17b | 255 | 1,790 | 6¾ |
| 18c | 18b | 250 | 1,820 | 5¾ |
| 19c | 19b | 260 | 1,890 | 5½ |
| 20c | 20b | 255 | 1,835 | 5¼ |
| 21c | 21b | 245 | 1,820 | 6¼ |
| 22c | 22b | 240 | 1,815 | 7¾ |
| 23c | 23b | 240 | 1,850 | 7 |
| 24c | 24b | 235 | 1,825 | 6½ |
| 25c | 25b | 235 | 1,830 | 8 |
| 26c | 26b | 250 | 1,750 | 7½ |
| 27c | 27b | 255 | 1,765 | 7½ |
| 28c | 28b | 245 | 1,765 | 6¾ |
| 29c | 29b | 240 | 1,780 | 5½ |
| 30c | 30b | 260 | 1,890 | 6 |
| 31c | 31b | 266 | 1,800 | 6¼ |
| 32c | 32b | 235 | 1,805 | 6⅓ |
| 33c | 33b | 255 | 1,790 | 7 |
| 34c | 34b | 255 | 1,780 | 7½ |
| 35c | 35b | 240 | 1,725 | 6¾ |
| 36c | 36b | 240 | 1,725 | 6 |
| 37c | 37b | 235 | 1,830 | 5¾ |
| 38c | 38b | 245 | 1,820 | 6½ |
| 39c | 39b | 260 | 1,880 | 6⅓ |
| 40c | 40b | 230 | 1,795 | 7 |
| 41c | 41b | 250 | 1,725 | 7½ |
| 42c | 42b | 240 | 1,800 | 7¾ |
| 43c | 43b | 245 | 1,790 | 5¾ |
| 44c | 44b | 260 | 1,820 | 6½ |
| 45c | 45b | 265 | 1,835 | 5 |
| 46c | 46b | 250 | 1,850 | 5½ |
| 47c | 47b | 255 | 1,815 | 6 |
| 48c | 48b | 240 | 1,790 | 6¾ |
| 49c | 49b | 230 | 1,750 | 6½ |
| 50c | 50b | 260 | 1,890 | 5¼ |
| 51c | 51b | 240 | 1,850 | 7½ |
| 52c | 52b | 245 | 1,730 | 7 |
| 53c | 53b | 240 | 1,865 | 6¾ |
| 54c | 54b | 255 | 1,770 | 7¼ |
| 55c | 55b | 235 | 1,840 | 5 |
| 56c | 56b | 230 | 1,890 | 5¾ |
| 57c | 57b | 255 | 1,755 | 6½ |
| 58c | 58b | 255 | 1,835 | 6¾ |
| 59c | 59b | 240 | 1,860 | 7½ |
| 60c | 60b | 250 | 1,820 | 7¼ |
| 61c | 61b | 250 | 1,850 | 8¼ |
| 62c | 62b | 240 | 1,795 | 8 |

As to change in physical appearance, as a result of hydrogenation, attention is directed to what has been said preceding. Hydrogenation in numerous cases does show some bleaching effect.

The hydrogenated product freed from solvent which would be susceptible to reaction with glycidyl allyl ether, was admixed with approximately 300 grams of xylene and approximately 1% of sodium methylate. Needless to say, the alcohol employed as a solvent, and for that matter, the xylene employed in Part 1 as a solvent, could be replaced by a solvent, which would not be objectionable either from a standpoint of hydrogenation or oxyalkylation, as, for example, decalin. Again, as has been pointed out, all the reactions involved can be conducted in absence of any solvent. This is purely a matter of convenience.

In noting the size of the batch subjected to reaction with allyl glycidyl ether, no account is taken for increase in weight, due to hydrogenation, for the reason that this is a comparatively small factor, and there have been some losses in filtering, and otherwise. Therefore, the figures that appear in the next part, i. e., Part 4, correspond in essence to the figures appearing in Table II, which show the grams of xylene solution, plus the oxide added. Actually, the treatment with allyl glycidyl ether, as previously noted, is an oxyalkylation process, and the reaction is conducted in the same manner as previously mentioned and is substantially the same as one would conventionally employ in the use of glycide.

PART 4

As previously indicated, the present part is concerned with the reaction between allyl glycidyl ether and the alicyclic compounds obtained in the manner described in Part 3, immediately preceding. Such alicyclic compounds are polyhydroxylated, having at least three or more hydroxyl radicals per molecule. Generally speaking, the number of hydroxyl radicals, if obtained by the reaction of ethylene oxide or propylene oxide, for example, would run from 3 to 7 or 8, unless the resin, prior to hydrogenation, had been treated in such a manner as to have present a greater number of phenolic hydroxyls, such as a condensation reaction to increase the resin molecule size. Obviously, if glycide or methyl glycide were used, the number of hydroxyl radicals would be substantially larger, for instance, 10, 15, 20, or even more. In any event, the amount of allyl glycidyl ether employed is sufficient to convert at least a plurality of hydroxyl radicals per molecule into the corresponding allyl compound and may be enough to convert all hydroxyls present, or two or three times this molal amount. More allyl glycidyl ether can be employed than corresponds to the molal proportion, based on hydroxyl radicals present, for the simple reason that at each stage of reaction a hydroxyl is obtained, which, in turn, is susceptible to further oxyalkylation with any alkylene oxide, and of course, with allyl glycidyl ether.

The use of allyl glycidyl ether, as previously noted, involves substantially the same procedure and equipment as glycide. The glass equipment, previously described could be used, although I have found it more convenient to employ the larger laboratory autoclave previously described. The use will be illustrated by the following examples.

As to further information in regard to allyl glycidyl ether, see Information Sheet DS-48-22 of Shell Development Co., Emeryville, California.

Example 1d

The same piece of equipment was employed as previously described in Part 2, i. e., an autoclave, although in the instant procedure involving the use of allyl glycidyl ether, there was no pressure involved and certain changes were made, as noted subsequently. The autoclave was equipped with a water-cooled condenser, which was shut off when used as an autoclave. It was equipped also with a separatory funnel, and an equalizing pressure tube, so the liquid, such as allyl glycidyl ether, could be fed continuously at a drop-wise or faster rate into the vessel, and the rate was controlled by visual examination. For convenience, this piece of equipment is referred to as an autoclave, because it is essentially designed for such use, but it is to be noted it is not so used when allyl glycidyl ether, or for that matter, glycidyl, was employed, as described in Part 2, preceding.

There were charged into the autoclave 921 grams of a xylene solution (containing 300 grams of xylene) identified as Example 1c, preceding. Such amount of sodium methylate equivalent to about 1% of the hydroxylated reactant, was added as a catalyst, which, in this instance, was 6.5 grams. The autoclave was sealed, swept with nitrogen gas and stirring started and heat applied immediately. The temperature was allowed to rise to 123° C. The allyl glycidyl ether employed was the technically pure product supplied by the Shell Development Co., Emeryville, California.

The hydroxylated reactant present in the autoclave represented approximately 3 moles of phenol when calculated back to the initial reactants described in Part 1. The amount of allyl glycidyl ether added was approximately 3 moles or 350 grams. This was added over a 3½ hour period. This was charged into the upper reservoir vessel which had been flushed out previously with nitrogen, and was, in essence, the equivalent of a separatory funnel. The oxide was started slowly into the reaction mass at a drop-wise rate. The reaction started immediately and the temperature rose approximately 13° to 19°. Cooling water was run through the coils so the temperature for the addition of the oxide was controlled within the range of 115° to 135° C. The reaction took place at atmospheric pressure, with simply a small stream of nitrogen passing into the autoclave at the very top, and passing out of the open condenser so as to avoid any possible entrance of air. Under such operation there was, of course, some loss of xylene, but examination revealed no loss of the oxide.

The product so obtained was fluid, lighter in color than the initial example, and on examination, was found to be comparatively free from unreacted oxide. Likewise, examination by determination of the hydroxyl number showed substantial completeness of reaction. Needless to say, such procedure also increased the water solubility of the product.

What is said in this instance in regard to physical properties applies for all practical purposes to all examples obtained. Obviously, where increased amounts of the ether were employed, the final product tended to show more and more the characteristics of a viscous liquid comparable to castor oil or slightly blown castor oil. The color also decreased as more oxide was added.

Example 2d

The same procedure was employed as in Example 1d, preceding, using the same operating procedure and substantially the same temperature range, with this difference: the product subjected to treatment with allyl glycidyl ether was the hydroxylated compound identified as Example 2c, preceding. The amount employed in the instance was 986 grams, including 300 grams of solvent. The amount of sodium methylate used as a catalyst was 7½ grams. In all other respects the operating procedure was identical with the two preceding examples.

Operating data in regard to similar examples are given in the tables immediately following.

Incidentally, it is to be noted that one need not use sodium methylate as a catalyst, but can use any one of a number of other suitable catalysts, such as caustic soda or caustic potash. Stannic chloride or boron fluoride ether complex are also satisfactory.

| Ex. No. | Ex. No. of Alicyclic Compound Used | Amt. of Alicyclic Compound Used (Solvent-free basis), grs. | Solvent | Amt., grs. | Catalyst | Amt., grs. | Amt. AGE, grs. | Molal ratio of AGE to each Mole Phenol Originally present | Max. Temperature °C. Reaction | Time of Reaction |
|---|---|---|---|---|---|---|---|---|---|---|
| 1d | 1c | 621 | Xylene | 300 | Sodium Methylate | 6.5 | 350 | 1:1 | Not over 138 | 3½ |
| 2d | 2c | 686 | ...do | 300 | ......do | 7½ | 350 | 1:1 | .....do | 2¾ |
| 3d | 3c | 721 | ...do | 300 | ......do | 7½ | 350 | 1:1 | .....do | 2½ |
| 4d | 10c | 789 | ...do | 300 | ......do | 8 | 350 | 1:1 | .....do | 4 |
| 5d | 11c | 854 | ...do | 300 | ......do | 9 | 350 | 1:1 | .....do | 3½ |
| 6d | 12c | 889 | ...do | 300 | ......do | 9 | 350 | 1:1 | .....do | 3½ |
| 7d | 17c | 867 | ...do | 300 | ......do | 9 | 350 | 1:1 | .....do | 3 |
| 8d | 18c | 932 | ...do | 300 | ......do | 10 | 350 | 1:1 | .....do | 2½ |
| 9d | 19c | 967 | ...do | 300 | ......do | 10 | 350 | 1:1 | .....do | 4 |
| 10d | 25c | 957 | ...do | 300 | ......do | 10 | 350 | 1:1 | .....do | 4½ |
| 11d | 26c | 1,022 | ...do | 300 | ......do | 10 | 350 | 1:1 | .....do | 4¾ |
| 12d | 27c | 1,057 | ...do | 300 | ......do | 11 | 350 | 1:1 | .....do | 3¾ |
| 13d | 1c | 621 | ...do | 300 | ......do | 7 | 260 | 3:4 | .....do | 2½ |
| 14d | 2c | 686 | ...do | 300 | ......do | 7 | 260 | 3:4 | .....do | 2¾ |
| 15d | 3c | 721 | ...do | 300 | ......do | 7 | 260 | 3:4 | .....do | 2 |
| 16d | 10c | 789 | ...do | 300 | ......do | 8½ | 260 | 3:4 | .....do | 3 |
| 17d | 11c | 854 | ...do | 300 | ......do | 9 | 260 | 3:4 | .....do | 3½ |
| 18d | 12c | 889 | ...do | 300 | ......do | 10 | 260 | 3:4 | .....do | 4½ |
| 19d | 17c | 867 | ...do | 300 | ......do | 9 | 260 | 3:4 | .....do | 4 |
| 20d | 18c | 932 | ...do | 300 | ......do | 9½ | 260 | 3:4 | .....do | 4½ |
| 21d | 19c | 967 | ...do | 300 | ......do | 10 | 260 | 3 4 | .....do | 3½ |
| 22d | 25c | 957 | ...do | 300 | ......do | 10 | 260 | 3:4 | .....do | 4 |
| 23d | 26c | 1,022 | ...do | 300 | ......do | 10 | 260 | 3:4 | .....do | 4¾ |
| 24d | 27c | 1,057 | ...do | 300 | ......do | 11 | 260 | 3:4 | .....do | 3½ |
| 25d | 37c | 745 | ...do | 300 | ......do | 8 | 350 | 1:1 | .....do | 3½ |
| 26d | 38c | 830 | ...do | 300 | ......do | 9½ | 350 | 1:1 | .....do | 4 |
| 27d | 39c | 875 | ...do | 300 | ......do | 9 | 350 | 1:1 | .....do | 3½ |
| 28d | 49c | 685 | ...do | 300 | ......do | 7 | 350 | 1:1 | .....do | 3 |
| 29d | 50c | 770 | ...do | 300 | ......do | 8½ | 350 | 1:1 | .....do | 3½ |
| 30d | 51c | 815 | ...do | 300 | ......do | 8½ | 350 | 1:1 | .....do | 2½ |

Attention is again directed to the fact that other suitable solvents other than xylene may be used, such as decalin, cymene, etc. Other suitable catalysts can be employed. It is also pointed out that the amount of allyl glycidyl ether employed need be only enough to introduce a plurality of allyl radicals per resin molecule, or may be enough to introduce a number of allyl radicals equal to the original phenolic hydroxyls, or twice as many, or three times as many. My preferred ratio is to use 3 moles of allyl glycidyl ether for each 4 moles of phenol originally used, or to use an equal number of moles, 4 for 4, or else, 5 moles of allyl glycidyl ether for each 4 moles of phenol originally used.

PART 5

The allyl-radical-containing products are polymerized in much the same way as comparable products, for instance, castor oil, dehydrated castor oil, allyl sucrose, or the like, are polymerized or thickened or bodied. Such polymerization is due essentially to the allyl groups undergoing allyl or vinyl condensation, or polymerization. Such vinyl polymerization is usually induced by use of a peroxide catalyst, such as benzoyl peroxide or blowing with a gaseous oxygen-containing medium, or by using a combination of the two procedures.

In any event, the usual steps are taken to free the compound from any solvent, such as xylene, which may be present and also to render it as nearly neutral as possible and to remove any inorganic salts which would tend to separate out. A slight basicity, due to the presence of a basic tertiary amine is desirable in connection with with the use of a peroxide. This applies whether the peroxide is used for partial polymerization, followed by blowing with air, for example, or is responsible totally for the polymerization. This practice, i. e., the use of a tertiary amine to act as an activator in peroxide, for instance, benzoyl peroxide, to induce polymerization is well known. Tin chloride seems to have similar properties, but is not as satisfactory. For a number of reasons, oxidation by means of air alone seems to be the simplest and the most satisfactory procedure.

Briefly stated then, the various products identified as Examples 1d through 30d in Part 4, preceding, are neutralized with sufficient concentrated hydrochloric acid to make them neutral. Any sodium chloride formed is removed by filtering. The product is then subjected to vacuum distillation which removes the xylene used as a solvent and also any water formed during the neutralization step. The final product varies from a semi-viscous liquid to a viscous or tacky liquid, or a product which exhibits almost a solid state at ordinary temperature. In all instances these products are fluid at the temperature employed for polymerization, for instance, 110° to 150° C. Previous reference has been made to the fact that polymerization with air is comparable to the procedure that is used in obtaining an oxidized oil or blown oil, or a polymerized castor oil from castor oil or similar materials, as, for example, allyl sucrose. Such products are produced by the common practice of blowing or oxidizing the polymerizable material by means of a gaseous medium, such as air, oxygen, ozone, or ozonized air. The gaseous medium, such as air, may be moist or dry and the oxidation, or better still, polymerization, may take place in presence or absence of a catalyst. The catalyst may be of a metallic type, such as lead ricinoleate, cobalt ricinoleate, manganese ricinoleate, etc., or it may be of an organic type which produces a peroxide, such as alpha pinene, linseed oil, etc. Similarly, as previously noted, peroxides themselves, such as benzoyl peroxide, or similar peroxides, may be employed as catalysts, or to inhibit the incipient stage of polymerization. Such peroxide catalyst may be used in presence of a basic tertiary amine, as previously noted. The amount of catalyst may vary from as little as one-tenth of 1%, to 1%, or somewhat less. The amount of tertiary amine employed in connection with the peroxide, is usually in approximately the same order of magnitude, i. e., one-tenth of 1%, up to 1%. Examples of such tertiary amines include tributylamine, triamylamine, tricyclohexylamine, etc.

Polymerization can be induced by oxidation at atmospheric pressures, or super atmospheric pressures, i. e., pressures up to or including 200 pounds gauge pressure, and at temperatures from slightly above the boiling point of water, up to any temperature that does not produce undue decomposition by pyrolytic reaction.

The time of polymerization, as induced by blowing or oxidation, may be fairly brief, for example, less than 25 hours, particularly if such oxidation takes place in conjunction with the use of a peroxide, such as acetyl peroxide, or benzoyl peroxide. On the other hand, in some instances, using a temperature of approximately 130° C., it is sometimes necessary to blow the mixture for as long as 125 to 150 hours.

Not infrequently there is a change in the index of refraction of products during the polymerization stage. In other words, as the allyl radicals disappear, due to polymerization, there is an increase in the index of refraction. Under any particular set of conditions a study of such index of refraction may be helpful in controlling the polymerization, although as a rule, viscosity is equally satisfactory, insofar that no effort is made to reach an exact quantitative point in the polymerization range. Generally speaking, I have attempted to prepare compounds having at least three different degrees of polymerization. One stage is where there has been a noticeable increase in viscosity, and the difference is substantially comparable to the difference between heavily blown castor oil and ordinary castor oil; the second stage is the point where the product begins to show incipient stringiness. This is probably where incipient gelation or cross-linking starts to take place. The third stage is where stringiness is not only obvious but a solution of the polymerized solution in xylene, for instance, a 50% solution, still shows stringiness, but is still soluble. It is to be noted that the ultimate product, whether below the stringy stage, or in the incipient stringy stage, or at the stage where even a 50% solution in xylene is stringy, must be soluble in an organic solvent, such as xylene, low molal alcohols, decalin, diethylether of ethylene glycol, cyclohexanal, or the like. If the product is not soluble in any one of the common hydrocarbon or oxygenated solvents it is not satisfactory for the herein described process.

Polymerization is illustrated by the following examples:

*Example 1e*

A product of the kind identified as Example 1d in Part 4, preceding, was freed from inorganic solvents and salts. The product was substantially neutral. 1500 grams of the product were placed in an ordinary 3-liter flask. The air terminal inlet was provided with a device which gave a multiplicity of small, fine bubbles. This was accomplished by means of a porous ceramic tube fitted to glass and available from various laboratory supply houses. The input of air was such that there was a continuous stream of air passing through the reaction mass sufficient to provide at least moderate agitation. The temperature was raised to 138° C., and then air was passed through for 117 hours. During approximately the first third of the period, i. e., for the first 40 hours, there did not seem to be any particular change.

During the second 40 hours the material began to darken and was almost blackish-red at the end of 80 hours. By this time there was a modest but appreciable change in viscosity, even though not so marked as at the end of the final reaction period. Viscosity, of course, could not be judged satisfactorily when the material was hot, but when the reaction mass was allowed to cool and the viscosity compared with that of the initial reaction mass at the same temperature, for instance, room temperature, it was obvious that a thickening, somewhat suggestive of the change that takes place when castor oil is converted into a light blown castor oil, had taken place.

At the end of the final period the viscosity of the product had greatly increased and was suggestive of that of heavily blown castor oil. The initial product showed a viscosity more comparable to ordinary castor oil. This product was considered a characteristic as being the result of mild blowing or mild polymerization. Note what is said in regard to such characterization in subsequent Example 7e.

*Example 2e*

The same procedure was followed in every way as in Example 1e, except that the initial charge was 1500 grams of a product identified as Example 2d in Part 4, preceding. The temperature of polymerization, the time period, the change in the product, change in color, final viscosity, etc., were substantially comparable to Example 1e, preceding.

*Example 3e*

The same procedure was followed in every way as in Example 1e, except that the initial charge was 1500 grams of a product identified as Example 3d in Part 4, preceding. The temperature of polymerization, the time period, the change in the product, change in color, final viscosity, etc., were substantially comparable to Example 1e, preceding.

*Example 4e*

The same procedure was followed in every way as in Example 1e, except that the initial charge was 1500 grams of a product identified as Example 28d in Part 4, preceding. The temperature of polymerization, the time period, the change in the product, change in color, final viscosity, etc., were substantially comparable to Example 1e, preceding.

*Example 5e*

The same procedure was followed in every way as in Example 1e, except that the initial charge was 1500 grams of a product identified as Example 29d, in Part 4, preceding. The temperature of polymerization, the time period, the change in the product, change in color, final viscosity, etc., were substantially comparable to Example 1e, preceding.

*Example 6e*

The same procedure was followed in every way as in the Example 1e, except that the initial charge was 1500 grams of a product identified as Example 30d, in Part 4, preceding. The temperature of polymerization, the time period, the change in the product, change in color, final viscosity, etc., were substantially comparable to Example 1e, preceding.

*Example 7e*

The same procedure was employed as in Examples 1e through 6e, preceding, except that a stirring device was included in the reaction flask along with the distributing unit. In this case the temperature was held at slightly less than in the previous six examples, i. e., at about 136° C. The stirring device apparently gave better oxidation, which, in turn, resulted in more effective polymerization. At the end of the 110 hours the product was not only stringy, but when mixed with an equal weight of xylene, the 50% xylene solution so obtained showed stringiness. In fact, the product, prior to dilution in xylene, was even more than stringy—it was somewhat rubbery. I have characterized the product which is blown just short of the rubbery or stringy stage, as exemplified by Examples 1e to 6e, preceding, as being mildly oxidized or mildly blown, or mildly polymerized.

I have used the expression "drastically-oxidized" to indicate a product which is not only stringy or rubbery as such, but also is highly viscous and shows stringiness or rubberiness in the 50% xylene solution. Such stage is typified by the present example, i. e., Example 7e.

*Examples 8e to 12e*

The same procedure, i. e., the production of a drastically polymerized product was applied to Examples 2d, 3d, 28d, 29d, and 30d, in the same manner as described in Examples 2e through 6e, inclusive, except that the stirring device was used in each instance and in no case was a temperature higher than 140° C. employed. In each instance the final products were dark, stringy, or almost rubbery and showed stringiness or rubberiness in a 50% solution of xylene.

*Example 13e*

The same procedure was employed in every respect as in Examples 1e, through 7e, preceding, and the particular procedure employed was the use of the stirring device, as described in Example 7e. The initial charge as before was 1500 grams of the product identified as Example 1d. The temperature of polymerization was again within the range of 130° to 140° C.

In this example, and in the subsequent five examples, the time period was less than in Examples 7e to 12e, inclusive. In the instant example it was 82 hours. This product at the end of this period showed a definite tendency to string or rubberize, but this property practically disappeared when a 50% solution in xylene was prepared. I have referred to this particular stage as being semi-drastically oxidized to indicate a product which shows incipient stringiness, as such, but where such stringiness disappears on dilution, as previously noted

Examples 13e to 18e, inclusive

The same procedure was followed as in Example 13e, preceding, i. e., a procedure employed so as to produce a semi-drastically polymerized product and the products subjected to polymerization were thus identified as Examples 2d, 3d, 28d, 29d, and 30d, in Part 4, preceding.

Actually blowing or polymerizing can be conducted with ozone or ozonized air, as well as air which may or may not have its moisture content eliminated. In this particular type of reaction I have found no advantage in going to any added cost in regard to the oxygenating procedure which initiates polymerization.

The same is true of a cataylst, such as lead, manganese or cobalt naphthenate or the like as has been described in the literature previously mentioned. Such catalyst in comparatively small amounts, one-tenth per cent or preferably less, will speed up the polymerization, but here again I have not found this particularly desirable. Since it is usually intended to stop the polymerization at some particular point by use of a mild blowing or a semi-drastic blowing, or a drastic blowing, it is of greater convenience to approach the end point slowly, rather than rapidly, and also to have polymerization cease when the air stream stops.

As I have pointed out previously, the period of oxidation can be controlled in various ways; for instance, a higher temperature can be used, or more air will be forced through the mass; more violent agitation can be employed; and most important of all, if desired, one can shorten the so-called incubation period by use of a peroxide alone, or a peroxide in combination with a tertiary amine. My experience indicates that in many instances there are present materials which appear to inhibit the polymerization step, possibly a trace of phenolic compounds. Oxidation appears to counteract or destroy these products slowly, and then an incubation period seems to develop where peroxide, or the like, is built up. After this stage, polymerization takes place comparatively rapidly. This conforms to the pattern of other comparable polymerizations involving allyl compounds. I have been able to cut down the time required in preparation of products characterized by Examples 1e through 18e, preceding, by doing nothing more than adding about ¼% of benzoyl peroxide and blowing until incipient viscosity change takes place. If this did not appear in the first ten hours, I then added a second equal portion of benzoyl peroxide and repeated. Usually, the first addition of benzoyl peroxide or a slightly larger amount was sufficient. In some instances I have made an addition of a third portion of benzoyl peroxide, but is has been exceptional that this has been required. Actually, all the various stages of polymerization can be obtained by use of a peroxide induced polymerization in a fourth or a third or in one-half the time required by air alone.

The final products obtained by these procedures varied from heavily viscous liquids to semi-rubbery or almost rubbery, or in fact, rubbery solids or semi-solids, which, in each and every instance, were soluble in an organic solvent, as previously described. Needless to say, oxidation can be conducted in any convenient size reaction vessel; in fact, in a flask smaller than a 3-liter flask. This size is used simply as a matter of convenience.

I have previously pointed out that the products so obtained have utility for processes other than being subjected to oxyalkylation.

PART 6

The polymerized derivatives of the kind described in Part 5, immediately preceding, were subjected to oxyalkylation by means of the various alkylene oxides previously described. The equipment used and the procedure were the same as described in Part 2, preceding, except in the following respect: In Part 2, preceding, the amount of alkylene oxide added per initial reactant, i. e., the product being subjected to oxyalkylation, was comparatively small. The amount of alkyleneoxide was in the neighborhood of one to two moles per phenolic hydroxyl. For this reason the reaction period was comparatively short, regardless of whether high temperature or low temperature oxyalkylation was used. The expression "high temperature" refers to oxyalkylation taking place at 150° to 200° C., or, in some instances, somewhat higher. The expression "low temperature" oxyalkylation refers to temperature approximately that of the boiling point of water, for instance, 80° to 90° C., with 100° to 110° C. as average, and perhaps as high as 120° C. at times. Suitable equipment is used to control the time period involved, i. e., the speed of injecting the oxide, and also the maximum temperature, the maximum pressure, etc. In Part 2, in order to use a comparatively low temperature (110° to 120° C.), two additional control units were connected to the equipment.

In the present oxyalkylation process, the amount of alkylene oxide being added is comparatively large, for instance, an equal weight or twice the weight, three times the weight, several times the weight, or even more, based on the initial reactant. For this reason, the higher temperatures were employed and the low temperature controls previously referred to in Part 2 were disconnected. The process is comparatively simple; the polymer, either as such as diluted with xylene or other suitable solvent, if desired, is placed in the autoclave along with a suitable amount of alkaline catalyst usually sodium methylate. The equipment is flushed out with nitrogen, various controls set, and oxylalkylation proceeds in the conventional manner. The procedure will be illustrated by the following examples.

Example 1f 500 grams of the polymer identified as Example 1e, preceding, were mixed with 500 grams of xylene and 10 grams of sodium methylate. The reaction vessel employed was a stainless steel autoclave with the usual devices for heating, heat control, stirrer, inlet, outlet, etc., which are conventional in this type of apparatus. The capacity of the autoclave was approximately 3½ liters. The stirrer was operated at approximately 30 R. P. M. There was charged into the autoclave the mixture previously referred to, i. e., the polymer, the solvent, and the catalyst. The autoclave was sealed, swept with nitrogen gas, and stirring started immediately and heat applied. The temperature was allowed to rise to approximately 150° C. The automatic controls were set to stop the reaction at 165° C. and also to stop the equipment in event the pressure got higher than 200 pounds per square inch. The amount of ethylene oxide added was 500 grams. The inlet speed was set so as to introduce this amount of oxide in 2½ hours. The injection of the ethylene oxide was controlled so it would all be added in one hour's time. An allowance was made for the fact that the pressure control or temperature control might stop the injection of ethylene oxide at various intervals during the addition of the oxide, and for this reason a 2-hour time period was allowed for actual injection of the oxide, i. e., injection at the rate of 500 grams per hour, plus an added interruption period of an hour, plus a half-hour for stirring at the end of the reaction. In actual operation the oxide was added in slightly over an hour, and the final period of stirring probably was considerably over an hour. This, of course, was purely a matter of convenience and immaterial for the reason that if the temperature had been raised slightly, or the amount of catalyst increased, the reaction could have taken place in even a shorter period of time, for instance, 45 minutes. No harm was done, of course, in extending the period of reaction, and likewise, no harm was done in having a longer stirring period during the reaction to insure there was no trace of ethylene oxide left. During this time the temperature did reach the maximum point, i. e., 165° but the pressure did not go higher than 170 pounds per square inch.

The resultant product was a light amber oil which dispersed readily in water either in presence of xylene, or after the xylene was removed. This oxyethylation product was subjected to further oxyethylation in the same manner as noted in the accompanying table under Example 2c. The example identified as 2c in the table was then subjected to a third stage of oxyethylation, as noted under Example 3c in the table. Various other oxyethylations were conducted in the same manner under substantially the same operating conditions. Such data are recorded in the table immediately following.

use propylene oxide in combination with either ethylene oxide or glycide, or both. It is understood that water-solubility may be particularly desirable to produce a surface-active agent, but water-solubility is not necessarily the criterion of an effective demulsifier. Indeed, some of the water-insoluble compounds obtained with propylene oxide appear to be as good demulsifiers as the more water-soluble ones obtained in a mixture of alkylene oxide, as described in the next succeeding paragraph.

In one modification the procedure followed was the same as in Examples 1f through 21f, but with this difference; in the first two stages of oxyalkylation the amount of ethylene oxide indicated was replaced by 32½% more of propylene oxide. In some instances the time required for oxypropylation was somewhat longer than for oxyethylation, and in some instances, the temperature was slightly higher, 5° C. to 12° C., for example. The former insoluble product after the second stage of oxypropylation was then treated with ethylene oxide in the same manner noted in the previous table. If the product did not happen to be water-soluble, or sufficiently water-soluble, a fourth oxypropylation was employed, using about 25% of the amount of ethylene oxide previously noted. This second addition of ethylene oxide and four oxyalkylation invariably produced water-solubility. Note what has been said previously that water-solubility per se is not a criterion of effective demulsifying action. It does, however, frequently characterize a water-soluble surface-active material suitable for purposes other than demulsification.

*Example 23f*

The same piece of equipment was used as previously described, i. e., an autoclave, although in the instant experiment involving the use of gly-

| Ex. No. | Derivative No. | Amt. Taken Grms. (Solvent free) | Solvent Present Grms. (Xylene) | Sod. Methylate Added, Grms. | ETO Added, Grms. | Time (hours) | Temp., Max., °C. | Max. Pres., lbs. per sq. in. | Approx. Ratio ETO to polymer by Weight | Solubility in water |
|---|---|---|---|---|---|---|---|---|---|---|
| 1f | 1e | 500 | 500 | 10 | 500 | 3 | 165 | 170 | 1:1 | Emuls. or sol. |
| 2f | 1f | 1,000 | 500 | 5 | 510 | 4 | 178 | 145 | 2:1 | Incr. sol. |
| 3f | 2f | 1,510 | 500 | 6 | 530 | 4½ | 180 | 170 | 3:1 | Excel. sol. |
| 4f | 2e | 505 | 510 | 11 | 505 | 3½ | 170 | 185 | 1:1 | Emuls. or sol. |
| 5f | 4f | 1,010 | 510 | 5 | 520 | 3½ | 175 | 170 | 2:1 | Increased |
| 6f | 5f | 1,530 | 510 | 7 | 500 | 4 | 185 | 160 | 3:1 | Excel. sol. |
| 7f | 3e | 495 | 485 | 10 | 520 | 4 | 155 | 150 | 1:1 | Emuls. or sol. |
| 8f | 7f | 1,015 | 485 | 4 | 510 | 4 | 164 | 150 | 2:1 | Incr. sol. |
| 9f | 8f | 1,525 | 485 | 5 | 490 | 3 | 169 | 150 | 3:1 | Excel. sol. |
| 10f | 7e | 503 | 498 | 12 | 495 | 3 | 150 | 160 | 1:1 | Emuls. or sol. |
| 11f | 10f | 998 | 498 | 5 | 490 | 3 | 151 | 180 | 2:1 | Incr. sol. |
| 12f | 11f | 1,488 | 498 | 5 | 525 | 4½ | 158 | 175 | 3:1 | Excel. sol. |
| 13f | 13e | 500 | 510 | 9 | 490 | 3 | 185 | 165 | 1:1 | Emuls. or sol. |
| 14f | 13f | 990 | 510 | 5 | 520 | 3 | 170 | 145 | 2:1 | Incr. sol. |
| 15f | 14f | 1,510 | 510 | 6 | 540 | 4 | 165 | 135 | 3:1 | Excel. sol. |
| 16f | 5e | 505 | 515 | 10 | 515 | 4 | 166 | 170 | 1:1 | Emuls. or sol. |
| 17f | 16f | 1,020 | 515 | 7 | 500 | 4½ | 165 | 155 | 2:1 | incr. sol. |
| 18f | 17f | 1,520 | 515 | 5 | 505 | 3½ | 180 | 150 | 3:1 | Excel. sol. |
| 19f | 6e | 520 | 505 | 10 | 510 | 3½ | 145 | 160 | 1:1 | Emuls. or sol. |
| 20f | 19f | 1,030 | 505 | 6 | 490 | 4½ | 155 | 170 | 2:1 | Incr. sol. |
| 21f | 20f | 1,520 | 505 | 5 | 520 | 4 | 165 | 180 | 3:1 | Excel. sol. |

*Example 22f*

Propylene oxide was used instead of ethylene oxide, following the same procedure as in Examples 1f through 21f, preceding, but with this particular change; the amount of propylene oxide added was reversed roughly in molar proportion, i. e., approximately 13¼ grams of propylene oxide were used to replace each 10 grams of ethylene oxide. Propylene oxide did not produce equivalent water-solubility, even at the ultimate stages, or even when used in a greater amount. For this reason, it is my preference to cide there was no pressure involved and certain changes were made, as noted subsequently. The autoclave was equipped with a water-cooled condenser, which was shut off when used as an autoclave. It was also equipped with a separatory funnel and an equalizing pressure tube, so that liquid, such as glycide, could be fed continuously at a drop-wise or a faster rate into the vessel and the rate was controlled by visual examination. For convenience, this piece of equipment is referred to as an autoclave, because it was designed essentially for such use, but it is to be noted it was not so used when glycide was employed as an alkylene oxide.

There were charged into the autoclave the same reactants (intermediate, solvent, and sodium methylate) as in Example 1f. The autoclave was sealed, swept with nitrogen gas and stirring started immediately and heat applied. The temperature was allowed to rise to 118° C. The glycide employed was comparatively pure. 360 grams of glycide were used. This was charged into the upper reservoir vessel which had been previously flushed out with nitrogen and was the equivalent of a separatory funnel. The glycide was started slowly into the reaction mass in a dropwise stream. The reaction started to take place immediately and the temperature rose approximately 10° to 15°. Cooling water was run through the coils so that the temperature for addition of glycide was controlled within the range roughly of 110° to 130° C. The addition was continuous within the limitations and all the glycide was added in less than 7 hours. This reaction took place at atmospheric pressure with simply a small stream of nitrogen passing into the autoclave at the very top and passing out through the open condenser, so as to avoid any possible entrance of air. This amount of glycide gave the product reasonably good solubility. However, a second addition of glycide was made without adding more catalyst. The amount added the second time was 130 grams. This was added the same way in approximately a 3-hour period. This product showed moderately increased solubility over the previous sample. A third addition of oxide was made after first introducing an additional 5 grams of sodium methylate as catalyst. The third addition consisted of 250 grams of glycide. The product showed excellent solubility and excellent surface-active characteristics after the third addition of glycide. Note what has been said previously that water-solubility per se is not necessarily an index as to demulsification characteristics.

Oxyalkylated derivatives can be obtained without the use of a solvent as a diluent. This is purely a matter of convenience. Whichever solvent is used, such as xylene, cymene, decalin, or the like, can be removed by distillation, and particularly vacuum distillation. For many purposes, such as for use in demulsifiers, the solvent can remain.

It is my preference, particularly for purpose of demulsification, to use an oxyalkylated derivative which is surface-active by a simple emulsification test intended to produce a xylene-water emulsion. A suitable procedure is as follows: The oxyalkylated product is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions, so produced, are usually xylene-in-water emulsions (oil-in-water type) particularly when the amount of distilled water used is at least slightly in excess of the volume of xylene solution, and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde), using an acid catalyst, and then followed by oxyalkylation, using 2 moles of ethylene oxide fo each phenolic hydroxyl, is helpful. Such resin, prior to oxyalkylation, has a molecular weight indicating about 4½ units per resin molecule. Such resin, when diluted with an equal weight of xylene, will serve to illustrate the above emulsification test.

In a few instances, the oxyalkylated product may not be sufficiently soluble in xylene alone, but may require the addition of some ethylene glycol diethylether, as described elsewhere. It is understood that such mixture, or any other similar mixture, is considered the equivalent of xylene for the purpose of this test.

In many cases there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a product is capable of producing a dispersion in water, is proof that it is distinctly hydrophile. In doubtful cases comparison can be made with the butyl-phenol-formaldehyde resin analogue, wherein 2 moles of ethylene oxide have been introduced for each phenolic nucleus. For more complete description of this test, see U. S. Patent No. 2,499,370, dated March 7, 1950, to De Groote et al.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas, in presence of xylene, such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification, or the presence of emulsifying properties and go through the range of homogeneous dispersibility or admixture with water, even in the presence of added water-insoluble solvent and minor proportions of common electrolytes as occur in oil field brines.

In summary then, for all practical purposes oxyalkylations of the kind herein described are conducted in the conventional manner. The oxyalkylated derivatives, so obtained, are employed for the resolution of petroleum emulsions of the water-in-oil type, as described in my copending application Serial No. 177,554, filed August 3, 1950. The oxyalkylated derivatives themselves may be used for a variety of purposes other than demulsification, where surface-active materials are of value, as, for example, producing emulsions, detergents, agricultural sprays, further reaction with chemical compounds reactive towards hydroxyl radicals, etc.

Specifically, then, the use of such oxyalkylated derivatives is not limited to the resolution of petroleum emulsions of the water-in-oil type.

Having thus described my invention, what I claim as new and desire to secure by Letters Patent is:

1. The process of (a) subjecting an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula:

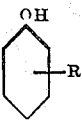

in which R is a hydrocarbon radical having at least 4 and not more than 18 carbon atoms and substituted in one of the positions ortho and para to oxyalkylation with an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule at the phenolic hydroxyls of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than two moles of alkylene oxide be introduced for each phenolic nucleus; (b) converting said oxyalkylated resin into the corresponding alicyclic compound by hydrogenation in presence of a hydrogenating catalyst; (c) reacting said hydroaromatic compound with allyl glycidyl ether, with the proviso that at least 2 moles of allyl glycidyl ether be reacted for each alicyclic molecule and not in excess of three times the number of hydroxyl radicals present in said molecule; (d) polymerizing said allyl radical-containing derivative to yield an organic solvent-soluble product; and (e) subjecting said aforementioned polymer to oxyethylation with (f) an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule at hydroxyl groups, of a plurality of divalent radicals having the formula ($R_1O$), in which $R_1$ is a member selected from the class consisting of ethylene radicals, propylene radicals, butylene radicals, hydroxylpropylene radicals, and hydroxybutylene radicals.

2. The process of (a) subjecting an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula:

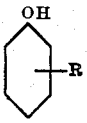

in which R is a hydrocarbon radical having at least 4 and not more than 18 carbon atoms and substituted in one of the positions ortho and para to oxyalkylation with an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule at the phenolic hydroxyls of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; with the proviso that from about one-half to less than two moles of alkylene oxide be introduced for each phenolic nucleus; (b) converting said oxyalkylated resin into the corresponding alicyclic compound by hydrogenation in presence of a hydrogenating catalyst; (c) reacting said hydroaromatic compound with allyl glycidyl ether, with the proviso that at least 2 moles of allyl glycidyl ether be reacted for each alicyclic molecule and not in excess of three times the number of hydroxyl radicals present in said molecule; (d) polymerizing said allyl radical-containing derivative to yield an organic solvent-soluble product; (e) subjecting said aforementioned polymer to oxyethylation with (f) an alpha-beta alkylene oxide having not more than 4 carbon atoms and selected from the class consisting of ethylene oxide, propylene oxide, butylene oxide, glycide and methylglycide; said oxyalkylated resin being characterized by the introduction into the resin molecule at hydroxyl groups, of a plurality of divalent radicals having the formula $R_1O$, in which $R_1$ is a member selected from the class consisting of ethylene radicals, propylene radicals, butylene radicals, hydroxypropylene radicals, and hydroxybutylene radicals; and with the final proviso that the hydrophile properties of said oxyalkylated resin in an equal weight of xylene are sufficient to produce an emulsion when said xylene solution is shaken vigorously with one to three volumes of water.

3. The process of claim 2, wherein the aldehyde is formaldehyde.

4. The process of claim 2, wherein the aldehyde is formaldehyde and the alkylene oxide is ethylene oxide.

5. The process of claim 2, wherein the aldehyde is formaldehyde and the alkylene oxide is ethylene oxide, with the proviso that in the (a) section, the molal ratio of ethylene oxide to initial phenolic hydroxyl be approximately 1 to 1.

6. The process of claim 2, wherein the aldehyde is formaldehyde and the alkylene oxide is ethylene oxide, with the proviso that in the (a) section, the molal ratio of ethylene oxide to initial phenolic hydroxyl be approximately 1 to 1; and with the further proviso that the molal ratio of allyl glycidal ether to the corresponding alicyclic hydroxyl be approximately 1 to 1.

7. The process of claim 2, wherein the aldehyde is formaldehyde and the alkylene oxide is ethylene oxide, with the proviso that in the (a) section, the molal ratio of ethylene oxide to initial phenolic hydroxyl be approximately 1 to 1; and with the further proviso that the molal ratio of allyl glycidyl ether to the corresponding alicyclic hydroxyl be approximately 1 to 1; and with the final proviso that the radical R is a butyl radical.

8. The process of claim 2, wherein the aldehyde is formaldehyde and the alkylene oxide is ethylene oxide, with the proviso that in the (a) section, the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is an amyl radical.

9. The process of claim 2, wherein the aldehyde is formaldehyde and the alkylene oxide is ethylene oxide, with the proviso that in the (a) section, the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is an octyl radical.

10. The process of claim 1, wherein the aldehyde is formaldehyde and the alkylene oxide is ethylene oxide, with the proviso that in the (a) section the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is a nonyl radical.

11. The process of claim 1, wherein the aldehyde is formaldehyde and the alkylene oxide is ethylene oxide, with the proviso that in the (a) section, the molal ratio of ethylene oxide to initial phenolic hydroxyl be approximately 1 to 1, and with the further proviso that the molal ratio of allyl glycidyl ether to the corresponding alicyclic hydroxyl be approximately 1 to 1; and with the final proviso that the radical R is a tetradecyl radical.

12. The product obtained by the process defined in claim 1.

13. The product obtained by the process defined in claim 2.

14. The product obtained by the process defined in claim 3.

15. The product obtained by the process defined in claim 4.

16. The product obtained by the process defined in claim 5.

17. The product obtained by the process defined in claim 6.

18. The product obtained by the process defined in claim 7.

19. The product obtained by the process defined in claim 8.

20. The product obtained by the process defined in claim 9.

21. The product obtained by the process defined in claim 10.

22. The product obtained by the process defined in claim 11.

MELVIN DE GROOTE.

REFERENCES CITED

The following references are of record in the file of this patent:

UNITED STATES PATENTS

| Number | Name | Date |
| --- | --- | --- |
| 2,528,932 | Wiles | Nov. 7, 1950 |